(12) United States Patent
Amir et al.

(10) Patent No.: US 6,204,828 B1
(45) Date of Patent: Mar. 20, 2001

(54) INTEGRATED GAZE/MANUAL CURSOR POSITIONING SYSTEM

(75) Inventors: Arnon Amir, Cupertino; Myron Dale Flickner, San Jose; Steven Carlyle Ihde, Palo Alto; Shumin Zhai, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/052,321

(22) Filed: Mar. 31, 1998

(51) Int. Cl.[7] ........................................ G09G 5/00
(52) U.S. Cl. ..................... 345/7; 345/8; 345/156; 345/157; 345/158
(58) Field of Search .................. 345/7, 8, 156, 345/157, 158

(56) References Cited

U.S. PATENT DOCUMENTS

| 4,595,990 | 6/1986 | Garwin et al. | 364/518 |
| 4,836,670 | 6/1989 | Hutchinson | 351/210 |
| 4,950,069 | 8/1990 | Hutchinson | 351/210 |
| 5,231,674 | 7/1993 | Cleveland et al. | 382/6 |

(List continued on next page.)

OTHER PUBLICATIONS

Jacob, Robert J. K., 'The Use of Eye Movements in Human–Computer Interaction techniques: What You Look At is What You Get', ACM Transactions on Information Systems, vol. 9, No. 3, Apr. 1991, pp. 152–169.*

Burrows et al., "Combining Eye–Tracking Mousse and Standard Cordless Mouse", IBM Tech. Disclosure Bulletin, vol. 36, No. 09B, Sep. 1993.

Goldberg et al., "Eye Gaze Contingent Control of the Computer Interface: Methodology and Example for Zoom Detection", Behav. Res. Methods Instrum. Comput. (USA), vol. 27, No. 3, Aug. 1995, pp. 338–350.

Goldberg et al., "Eye–Gaze Determination of User Intent at the Computer Interface", Eye Movement Research, 1995. pp. 491–502.

(List continued on next page.)

*Primary Examiner*—Richard A. Hjerpe
*Assistant Examiner*—Henry N. Tran
(74) *Attorney, Agent, or Firm*—Dan Hubert & Assoc.

(57) ABSTRACT

A computer-driven system aids operator positioning of a cursor by integrating eye gaze and manual operator input, thus reducing pointing time and operator fatigue. A gaze tracking apparatus monitors operator eye orientation while the operator views a video screen. Concurrently, the computer monitors an input device, such as a mouse, for mechanical activation by the operator. According to the operator's eye orientation, the computer calculates the operator's gaze position. Also computed is a gaze area, comprising a sub-region of the video screen that includes the gaze position. This region, for example, may be a circle of sufficient radius to include the point of actual gaze with a certain likelihood. When the computer detects mechanical activation of the operator input device, it determines an initial cursor display position within the current gaze area. This position may be a predetermined location with respect to the gaze area, such as a point on the bottom of the gaze area periphery. A different approach uses the initial mechanical activation of the input device to determine the direction of motion, and sets the initial display position on the opposite side of the gaze area from this motion so that continued movement of the input device brings the cursor to the gaze position in a seamless transition between gaze and manual input. After displaying the cursor on the video screen at the initial display position, the cursor is thereafter positioned manually according to the operator's use of the input device, without regard to gaze.

58 Claims, 3 Drawing Sheets

U.S. PATENT DOCUMENTS

| | | | |
|---|---|---|---|
| 5,270,748 | 12/1993 | Katz | 351/210 |
| 5,345,281 | 9/1994 | Taboada et al. | 351/210 |
| 5,360,971 | 11/1994 | Kaufman et al. | 250/221 |
| 5,367,315 | 11/1994 | Pan | 345/156 |
| 5,430,505 | 7/1995 | Katz | 351/208 |
| 5,471,542 | 11/1995 | Ragland | 382/128 |
| 5,481,622 | 1/1996 | Gerhardt et al. | 382/103 |
| 5,491,757 | 2/1996 | Lehmer et al. | 382/128 |
| 5,517,021 | 5/1996 | Kaufman et al. | 250/221 |
| 5,617,312 | 4/1997 | Iura et al. | 364/188 |
| 5,620,436 | 4/1997 | Lang et al. | 606/4 |
| 5,638,176 | 6/1997 | Hobbs et al. | 356/355 |
| 5,689,619 | 11/1997 | Smyth | 395/10 |
| 5,859,642 * | 1/1999 | Jones | 345/352 |

OTHER PUBLICATIONS

Barfield et al., *Virtual Environments and Advanced Interface Design*, Chapter entitled "Eye Tracking in Advanced Interface Design", 1995, pp. 258–288.

R. J. K. Jacob, "What You Look at is What You Get: Eye Movement User Interfaces", IEEE Computer, vol. 26, No. 7, pp. 65–67, Jul. 1993.

Ware et al., "An Evaluation of an Eye Tracker as a Device for Computer Input", Assn. for Computing Machinery CHI+G Conference Proceedings, 1987, pp. 183–188.

Young et al., "Methods & Designs: Survey of Eye Movement Recording Methods", Behavior Research Methods & Instrumentation (1975), vol. 7(5), pp. 397–429.

* cited by examiner

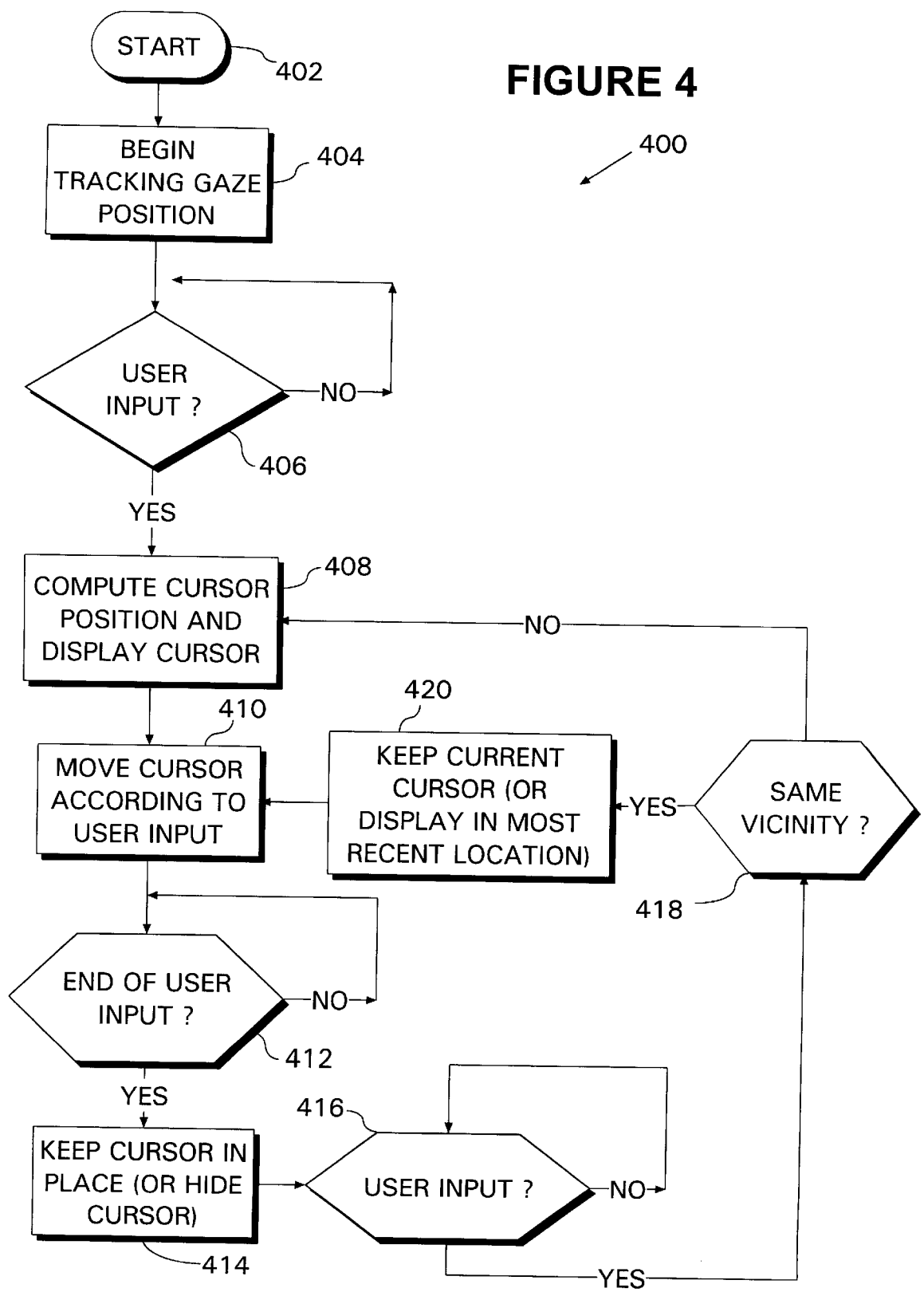

INTEGRATED GAZE/MANUAL CURSOR POSITIONING SYSTEM

BACKGROUND OF THE INVENTION

1. Field of the Invention

The present invention relates to video cursor positioning systems. More particularly, the invention concerns a system for positioning a cursor on a video screen, in which pointing time and operator fatigue are reduced by integrating eye gaze tracking and manual operator input.

2. Description of the Related Art

In human-computer interaction, one of the most basic elements involves selecting a target using a pointing device. Target selection is involved in opening a file with a mouse "click", activating a world wide web link, selecting a menu item, redefining a typing or drawing insertion position, and other such operations. Engineers and scientists have developed many different approaches to target selection. One of the most popular target selection devices is the computer mouse. Although computer mouses are practically essential with today's computers, intense use can cause fatigue and repetitive motion injury.

Despite these limitations, further improvement of mouse-activated target selection systems has been difficult. One interesting idea for possible improvement uses eye gaze tracking instead of mouse input. There are several known techniques for monitoring eye gaze. One approach senses the electrical impulses of eye muscles to determine eye gaze. Another approach magnetically senses the position of special user-worn contact lenses having tiny magnetic coils. Still another technique, called "corneal reflection", calculates eye gaze by projecting an invisible beam of light toward the eye, and monitoring the angular difference between pupil position and reflection of the light beam.

With these types of gaze tracking systems, the cursor is positioned on a video screen according to the calculated gaze of the computer operator. A number of different techniques have been developed to select a target in these systems. In one example, the system selects a target when it detects the operator fixating at the target for a certain time. Another way to select a target is when the operator's eye blinks. One problem with these systems is that humans use their the eyes naturally as perceptive, not manipulative, body parts. Eye movement is often outside conscious thought, and it can be stressful to carefully guide eye movement as required to accurately use these target selection systems. For many operators, controlling blinking or staring can be difficult, and may lead to inadvertent and erroneous target selection. Thus, although eye gaze is theoretically faster than any other body part, the need to use unnatural selection (e.g., by blinking or staring) limits the speed advantage of gaze controlled pointing over manual pointing.

Another limitation of the foregoing systems is the difficulty in making accurate and reliable eye tracking systems. Only relatively large targets can be selected by gaze controlling pointing techniques, because of eye jitter and other inherent difficulties in precisely monitoring eye gaze.

Consequently, known gaze-based target selection systems are not adequate for some applications due to certain unsolved problems.

SUMMARY OF THE INVENTION

Broadly, the present invention concerns a system for positioning a cursor on a video screen, where eye gaze information and manual operator input are integrated to reduce pointing time and associated operator fatigue. With the invention, pointing and target selection are perceived as a manual task, but they are aided with gaze tracking. Gaze aided tracking is used to dynamically redefine a home position of the pointing cursor in the vicinity of the target of interest, to reduce the subsequent movement distance needed to manually select the target.

A gaze tracking apparatus monitors eye orientation of a computer operator as the operator views a video screen. Concurrently, the computer monitors an operator input device for activation by the operator. The manual operator input device comprises a mechanically activated device, such as a mouse, keyboard, isometric pointing transducer, trackball, and the like. According to the operator's eye orientation, the computer measures the point of the operator's gaze, called "gaze position." The computer also calculates a region of video screen surrounding the operator's gaze position. This region, for example, may be a circle that is calculated to include the operator's "actual gaze point" (as opposed to measured gaze position) with a certain probability.

When the computer detects mechanical activation of the operator input device, it determines an "initial display position" within the gaze area, at which to display the cursor. As one example, the initial display position may be a predetermined location with respect to the gaze area, such as a point on the bottom or top of the gaze area periphery. A different approach is to determine an initial direction of motion from the activation of the input device, and then set the initial display position on the opposite side of the gaze area from this motion. Therefore, continued movement of the input device in the same direction will direct the cursor to the measured gaze position, providing a seamless transition from gaze to manual input.

After displaying the cursor on the video screen at the initial display position, the cursor is thereafter positioned manually according to the operator's use of the input device. If the input device becomes inactive for a prescribed time, and is thereafter reactivated, the computer determines the difference between the cursor's position when inactivity began and the operator's present gaze position. If this difference is small, the cursor continues to appear where it was left when the input device became inactive. However, if there is a large difference, a new initial display position is calculated, considering gaze area and input device movement as mentioned above, and the cursor is repositioned there.

Accordingly, in one embodiment, the invention may be implemented to provide a computer-driven method to position a cursor on a video screen, where eye gaze information and manual operator input are integrated to reduce pointing time and associated operator fatigue. In another embodiment, the invention may be implemented to provide an apparatus, such as a digital processing apparatus, configured to position a cursor on a video screen, where eye gaze information and manual operator input are integrated to reduce pointing time and associated operator fatigue. In still another embodiment, the invention may be implemented to provide a signal-bearing medium tangibly embodying a program of machine-readable instructions executable by a digital data processing apparatus to perform method steps for positioning a cursor on a video screen, where eye gaze information and manual operator input are integrated to reduce pointing time and associated operator fatigue.

The invention affords its users with a number of distinct advantages. Generally, the invention enables computer users to select video screen targets more quickly than with a manual pointing device alone. Since the user's target of interest is always inside the gaze area, and the cursor is initially presented near the gaze area, the user does not have to move the cursor over large distances of the computer screen. Advantageously, the pointing cursor always appears near where it needs to be. The faster speed and use of gaze helps reduces an operator's reliance on a computer mouse and keyboard, helping to avoid fatigue and possible repetitive motion injuries. In addition, the integration of gaze and manual input is seamless and therefore especially convenient to the operator. The invention also provides a number of other advantages and benefits, which should be apparent from the following description of the invention.

BRIEF DESCRIPTION OF THE DRAWINGS

FIG. 4 is a flowchart showing computer-implemented process steps used to implement one particular embodiment of integrated gaze/manual cursor management system according to the invention.

DETAILED DESCRIPTION

The nature, objects, and advantages of the invention will become more apparent to those skilled in the art after considering the following detailed description in connection with the accompanying drawings. As mentioned above, the invention concerns a cursor positioning system that increases pointing speed and reduces operator fatigue by integrating eye gaze tracking and manual operator input.

HARDWARE COMPONENTS & INTERCONNECTIONS

System Overview

Figure 1:
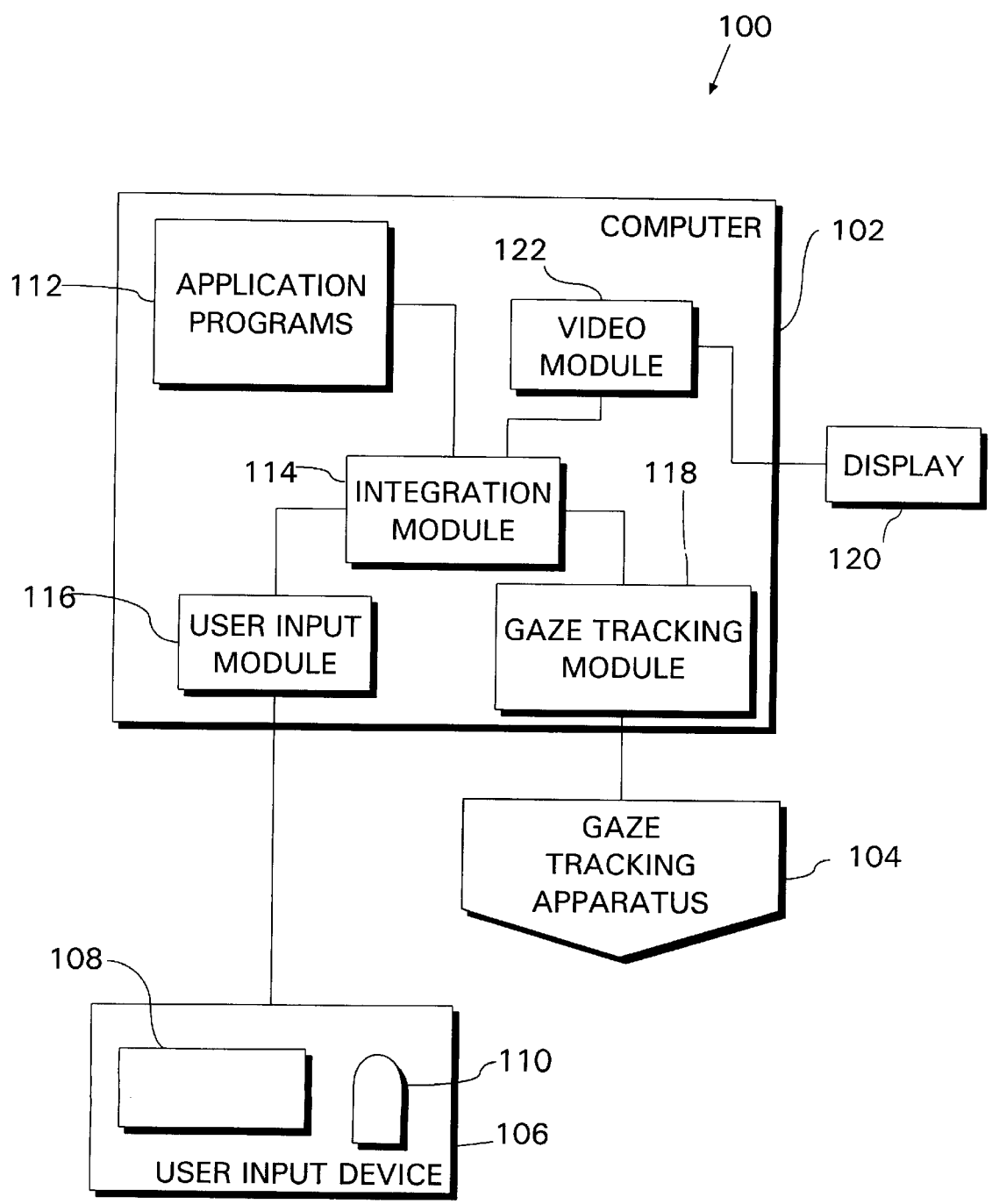
FIG. 1 is a block diagram of the hardware components and interconnections of an integrated gaze/manual cursor management system in accordance with the invention.

One aspect of the invention concerns an integrated gaze/manual cursor positioning system, which may be embodied by various hardware components and interconnections as illustrated by the system 100 of FIG. 1. Generally, the system 100 includes a computer 102, a gaze tracking apparatus 104, a user input device 106, and a display 120. The system 100 is used by a "user", also called an "operator" (not shown).

Gaze Tracking Apparatus

The gaze tracking apparatus 104 is a device for monitoring the eye gaze of the computer operator. The device 104 may use many different techniques to monitor eye gaze, depending upon the particular needs of the application. As one example, the device 104 may employ one or more of the following:

1. Electro-Oculography. This technique places skin electrodes around the eye, and records potential differences, representative of eye position.
2. Corneal Reflection. This technique directs an infrared light beam at the operator's eye and measures the angular difference between the operator's mobile pupil and the stationary light beam reflection.
3. Lumbus, Pupil, and Eyelid Tracking. These techniques include scanning the eye region with an apparatus such as a television camera or other scanner, and analyzing the resultant image.
4. Contact Lens. These techniques use some device attached to the eye with a specially manufactured contact lens. With the "optical lever", for example, one or more plane mirror surfaces ground on the lens reflect light from a light source to a photographic plate or photocell or quadrant detector array. Another approach uses a magnetic sensor in conjunction with contact lenses with implanted magnetic coils.

A number of different gaze tracking approaches are surveyed in the following reference, which is incorporated herein in its entirety: Young et al., "Methods & Designs: Survey of Eye Movement Recording Methods", Behavior Research Methods & Instrumentation, 1975, Vol. 7(5), pp. 397–429. Ordinarily skilled artisans, having the benefit of this disclosure, will also recognize a number of different devices suitable for use as the apparatus 104.

As a specific example of one gaze tracking approach for use in the present invention, reference is made to the following patents, incorporated herein in their entirety: (1) U.S. Pat. No. 4,836,670 to Hutchison, issued Jun. 6, 1989 and entitled "Eye Movement Detector", (2) U.S. Pat. No. 4,950,069 to Hutchison, issued Aug. 21, 1990 and entitled "Eye Movement Detector With Improved Calibration and Speed", and (3) U.S. Pat. No. 4,595,990 to Garwin et al., issued Jun. 17, 1986 and entitled "Eye Controlled Information Transfer". Also, although the invention's gaze tracking apparatus 104 may be a custom product, a commercially available product may be used instead, such as the EyeTrac Series 4000 product by Applied Science Labs, or the Eye-Gaze system by LC Technology.

Although the software programming associated with the gaze tracking apparatus 104 may be included with the apparatus 104 itself, the particular example of FIG. 1 shows the associated software implemented in the gaze tracking module 118, described below. The module 118 may be included solely in the computer 102, in the apparatus 104, or in a combination of the two, depending upon the particular application.

Advantageously, the invention is capable of accurate operation with inexpensive, relatively low-resolution gaze tracking apparatuses. For instance, significant benefits can be gained with gaze tracking accuracy ±3 degrees, which is a low error requirement for gaze tracking systems. With this level of permissible error, the gaze tracking apparatus 104 may comprise an inexpensive video camera, many of which are known and becoming increasingly popular for use in computer systems.

User Input Device(s)

The user input device 106 comprises an operator input device with an element sensitive to pressure, physical contact, or other manual activation by a human operator. This is referred to as "manual" input that "mechanically" activates the input device 106, in contrast to gaze input from the gaze tracking apparatus. As an example, the device 106 may include one or more of the following: a computer keyboard, a mouse, "track-ball", a foot-activated switch or trigger, pressure-sensitive transducer stick such as the IBM TRACKPOINT product, tongue activated pointer, and/or another mechanically activated device. In the particular embodiment illustrated in FIG. 1, a keyboard 108 and mouse 110 are shown. Although the software programming associated with the input device 106 may be included with the device 106, the particular example of FIG. 1 shows the necessary input device software implemented in the user input module 116, described below. The module 116 may be included solely in the computer 102, the input device 106, or a combination of the two, depending upon the particular application.

Display

The display 120 provides an electronic medium for optically presenting text and graphics to the operator. The display 120 may be implemented by any suitable computer display with sufficient ability to depict graphical images including a cursor. For instance, the display 120 may employ a cathode ray tube, liquid crystal diode screen, light emitting diode screen, or another suitable video apparatus. The images of the display 120 are determined by signals from the video module 122, described below. The display 120 may also be referred to by other names, such as video display, video screen, display screen, video monitor, display monitor, etc. The displayed cursor may comprise an arrow, bracket, short line, dot, cross-hair, or any other image suitable for selecting targets, positioning an insertion point for text or graphics, etc.

Computer

The computer 102 includes one or more application programs 112, a user input module 116, a gaze tracking module 118, an integration module 114, and a video module 122. The computer 102 may be a new machine, or one selected from any number of different products such as a known personal computer, computer workstation, mainframe computer, or another suitable digital data processing device. As an example, the computer 102 may be an IBM THINKPAD computer. Although such a computer clearly includes a number of other components in addition those of FIG. 1, these components are omitted from FIG. 1 for ease of illustration.

The video module 122 comprises a product that generates video signals representing images. These signals are compatible with the display 120, and cause the display 120 to show the corresponding images. The video module 122 may be provided by hardware, software, or a combination. As a more specific example, the video module 122 may be a video display card, such as an SVGA card.

The application programs 112 comprise various programs running on the computer 102, and requiring operator input from time to time. This input may include text (entered via the keyboard 108) as well as positional and target selection information (entered using the mouse 110). The positional information positions a cursor relative to images supplied by the application program. The target selection information selects a portion of the displayed screen image identified by the cursor position at the moment the operator performs an operation such as a mouse "click". Examples of application programs 112 include commercially available programs such as database programs, word processing, financial software, computer games, computer aided design, etc.

The user input module 116 comprises a software module configured to receive and interpret signals from the input device 106. As a specific example, the module 116 may include a mouse driver that receives electrical signals from the mouse 110 and provides an x-y output representing where the mouse is positioned. Similarly, the gaze tracking module 118 comprises a software module configured to receive and interpret signals from the gaze tracking apparatus 104. As a specific example, the module 118 may include a program that receives electrical signals from the apparatus 104 and provides an x-y output representing a point where the operator is calculated to be gazing, called the "gaze position".

As explained in greater detail below, the integration module 114 serves to integrate manual operator input (from the user input module 116 and input device 106) with eye gaze input (from the gaze tracking apparatus 104 and gaze tracking module 118). The integration module 114 applies certain criteria to input from the components 104/106 to determine how the cursor is shown on the display 120.

Exemplary Digital Data Processing Apparatus

Another aspect of the invention concerns a digital data processing apparatus, which may be used to implement one or more components of the system 100. This apparatus may be embodied by various hardware components and interconnections, as exemplified in FIG. 2 by the digital data processing apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory, and may be used to store the programming instructions executed by the processor 202. The nonvolatile storage 208 may comprise, for example, one or more magnetic data storage disks such as a "hard drive", electronic read-only memory, magnetic tape, CD-ROM, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

OPERATION

In addition to the hardware environment described above, a different aspect of the invention concerns a computer-implemented method for cursor positioning by integrating gaze tracking and manual operator input. As an example, this method may be implemented in the particular hardware environment discussed above.

Signal-Bearing Media

Figure 2:
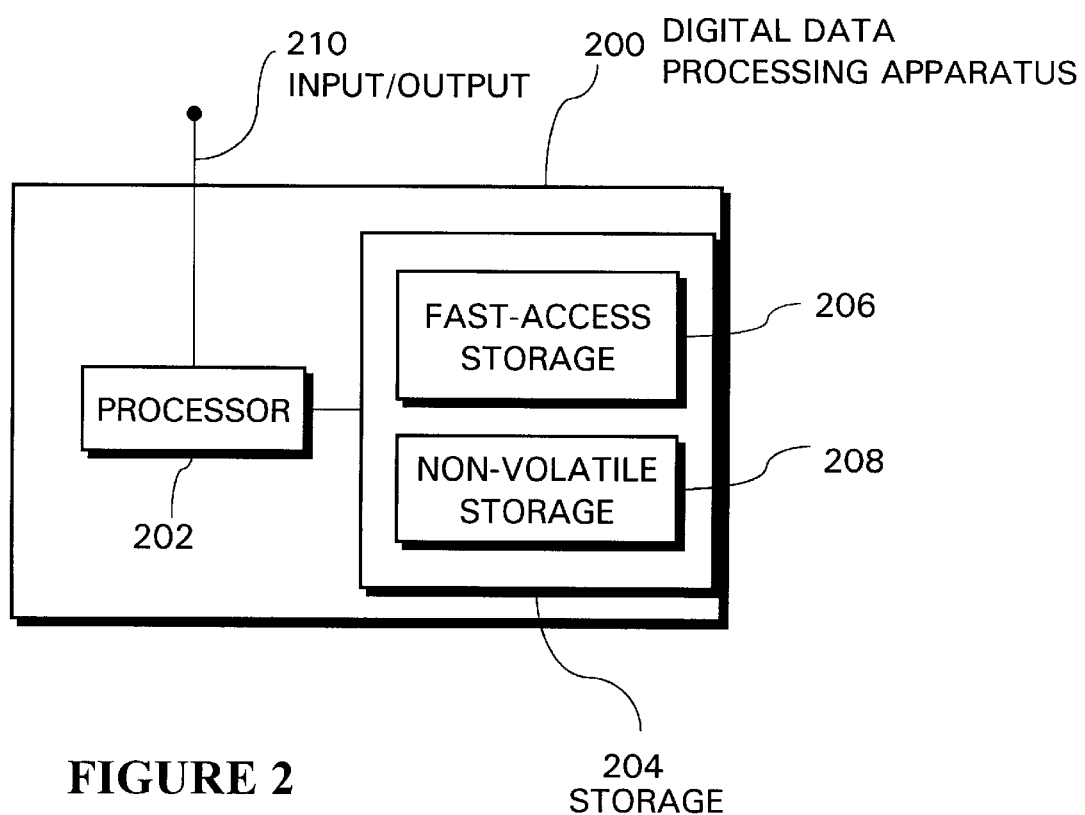
FIG. 2 is a block diagram of a digital data processing machine in accordance with the invention.

In the context of FIGS. 1–2, such a method may be implemented, for example, by operating the computer 102 (FIG. 1), as embodied by a digital data processing apparatus 200 (FIG. 2), to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to perform integrated gaze/manual cursor positioning.

Figure 3:
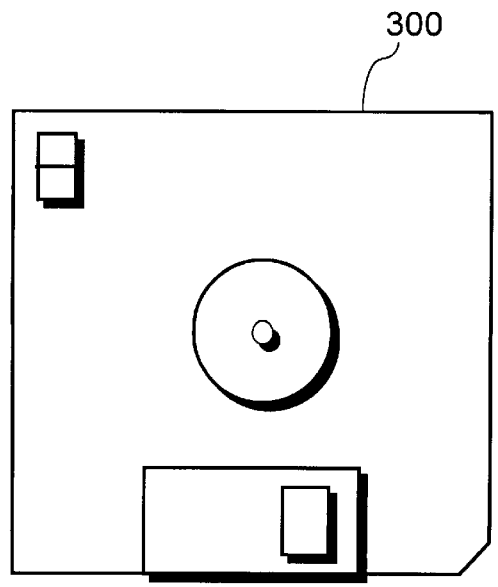
FIG. 3 shows an exemplary signal-bearing medium in accordance with the invention.

This signal-bearing media may comprise, for example, RAM (not shown) contained within the computer 102, as represented by the fast-access storage 206 for example. Alternatively, the instructions may be contained in another signal-bearing media, such as a magnetic data storage diskette 300 (FIG. 3), directly or indirectly accessible by the computer 102. Whether contained in the diskette 300, the computer 102, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Overall Sequence of Operation

Introduction

FIG. 4 shows a sequence of method steps 400 to illustrate one example of the method aspect of the present invention. For ease of explanation, but without any limitation intended thereby, the example of FIG. 4 is described in the context of the hardware environment described above in FIGS. 1–2. The process 400 is initiated in step 402. As an example, this may occur automatically when the computer 102 boots-up, under control of one of the application programs 112, when the operator manually activates the integration module 114, or at another time. In the illustrated example, when the routine 400 begins, display of the cursor associated with the user input device 106 is suppressed ("hidden").

Tracking "Gaze Position"

In response to step 402, the integration module 114 starts to monitor the operator's gaze position in step 404. The gaze position is a point where the gaze tracking apparatus 104 and gaze tracking module 118 calculate the operator's actual gaze point to be. This calculated point may include some error due to the limits of resolution of the gaze tracking apparatus 104, intrinsic difficulties in calculating gaze (e.g., accounting for head movement in corneal reflection systems, etc.), and other sources of error. These sources of error are collectively referred to as "system noise", and may be understood by studying and measuring the operation of the system 100. For example, it may be determined in some systems that the error between gaze position and actual gaze point has a Gaussian distribution.

As an example, step 404 may be performed by receiving x-y position signals from the gaze tracking module 118.

Detecting User Input

In step 406, the integration module 114 determines whether there has been any manual user input from the device 106. In other words, step 406 determines whether the input device 106 has been mechanically activated by the user. In the present example, step 406 senses whether the operator has moved the mouse 110 across its resting surface, such as a mouse pad. In a system where a trackball is used instead of the mouse 110, step 406 senses whether the ball has been rolled.

Responding to User Input

If movement is detected, the integration module 114 computes an "initial display position" and displays the cursor at this position in step 408. In an alternative embodiment, initial display position may be computed continually, periodically, or according to another schedule independent of the presence of operator input.

In the illustrated example, the initial display position is computed by the following sub-steps. Although these steps are described in an order that represents one embodiment of the invention, this order may be changed in different ways without departing from the scope of this invention.

First, a "gaze area" is calculated, comprising a region that surrounds the gaze position at the time manual user input is received and includes the operator's actual gaze point. As one example, the gaze area may be calculated to include the actual gaze point with a prescribed degree of probability, such as 95%. In other words, the gaze area in this example comprises a region in which the user's actual gaze point is statistically likely to reside, considering the measured gaze position and predicted or known system noise. Thus, the gaze area's shape and size may change according to cursor position on the display 120, because some areas of the display 120 may be associated with greater noise than others. As a further example, the gaze area may comprise a circle of sufficient radius to include the actual gaze point within a prescribed probability, such as three standard deviations ("sigma"). In this embodiment, the circle representing the gaze area may change in radius at different display positions; alternatively, the circle may exhibit a constant radius large enough to include the actual gaze point with the prescribed probability at any point on the display 120. Of course, ordinarily skilled artisans having the benefit of this disclosure will recognize a number of other shapes and configurations of gaze area without departing from this invention.

Also in step 408, the integration module 114 determines the direction of the initial mouse movement, as originally detected in step 406. This may be performed, for example, by processing the mouse's output signals to develop a mouse movement vector. This vector represents the average direction of mouse movement, and can be calculated in a matter of milliseconds.

Having identified the direction of initial mouse movement, the integration module 114 identifies the approximate center of the gaze area, and computes a line projecting outward from the approximate center, opposite the direction of the mouse movement vector. With this information, the integration module 114 identifies a point where the line from the gaze area's center intersects the periphery of the gaze area. This is the initial display position. Thus, the initial display position is positioned so that, if the operator continues to move the mouse in the same direction as initially detected, the mouse will travel into the gaze area and toward its center. Thus, the initial display position is placed on the opposite side of the gaze area from the direction the mouse is initially moved. As an example, if the user input of step 406 comprises movement toward the top of the display 120, the initial display position is set at the bottom periphery of the gaze area.

Having computed the initial display position in step 408, the integration module 114 displays the cursor there. The cursor having been suppressed, this initial appearance of the cursor is called "warping". Accordingly, in step 408 the cursor is said to have "warped" to its initial display position.

As one option, one or more highly visible animations may be used to help the operator find the warped cursor in its initial display position. Namely, the cursor may exhibit a brief animation (known as "spriting") to catch the operator's eye and enable the operator to quickly reacquire the cursor. One example of this animation comprises a briefly appearing sequence of increasingly smaller circles, drawn concentric to the cursor's initial display position. Since the human visual system is very sensitive to motion, the animated cursor is quickly found by the operator. After the animation completes, the operator has a visual lock on the cursor and proceeds to reposition the cursor normally with the input device 106.

As an alternative to the initial display calculation described above (step 408), the initial display position may have a fixed relationship with respect to the gaze area. For instance, the initial display position may always be at the bottom of the gaze area, or another area such as the top, top-right corner, center, etc. Some users may benefit from a static initial display position, due to its consistency. Since the user can always anticipate the cursor's initial position, the user can consistently initiate cursor movement in the same direction.

As another initial display position alternative, the selection of the initial display position may also consider video screen content as input. For example, if the calculated gaze area only includes one target (such as an icon), the initial display position may be placed over that target. If the gaze area includes multiple targets, the initial display position may consider a predetermined default target, a historically most-frequent target, a position between competing targets of equal status, the target most aligned with the initial direction of the user input device, etc.

After step 408, the integration module 114 directs normal movement of the cursor according to user input through the input device 106, irrespective of eye gaze.

In one embodiment of the invention, the system 100 may be implemented to automatically recalibrate the gaze tracking module 118. Namely, if the operator selects a target in the gaze area, the selected target is assumed to be the actual gaze point. The predicted gaze position and the position of the selected target are sent to the gaze tracking module 118 as representative "new data" for use in recalibration. The gaze tracking module 118 may use the new data to recalibrate the gaze direction calculation. The integration module 114 may also use this data to update the calculation of the gaze area on the display 120. The recalibration may compensate for many different error sources. For example, recalibration may be done per user or video display, or for different operating conditions such as indoor use, outdoor use, stationary/moving system operation, etc. Regardless of the way the new data is used by the gaze tracking apparatus 104, the new data may also be used by the integration module 114 to estimate the size and shape of the gaze area on the display 120. For example, in the system 100, the standard deviation of error can be estimated and updated according to the new data. The gaze area may also be estimated independently by the application programs 112. For purposes of recalibration and gaze area estimation, the system 100 and the gaze tracking apparatus 104 may maintain and save history and statistics of the new data. This allows profiles to be created and restored for each user, system, operating condition, etc.

User Inactivity

Normal cursor movement continues in step 410 until the integration module 114 detects user inactivity in step 412. User inactivity may be defined by various conditions, such as absence of mouse input for a predetermined time, such as 100 milliseconds. As another option, inactivity may constitute the absence of any input from all components of the user input device 106. In response to user in activity, the integration module 114 keeps displaying the cursor in the same place, as shown by step 414. As an alternative, the module 114 may respond to the detected inactivity by hiding the cursor.

Sensing and Processing Renewed Activity

The module 114 then monitors the user input device 106 for renewed activity in step 416. In the illustrated embodiment, renewed activity comprises movement of the mouse 110, representing a horizontal and/or vertical cursor movement. However, other types of renewed activity may be sensed, such as clicking one or more mouse buttons, striking a keyboard key, etc. Despite the end and renewal of user activity, the gaze tracking apparatus 104 and gaze tracking module 118 continue to cooperatively follow the operator's gaze, and periodically recalculate the current gaze position. In response to the renewed activity, the routine 400 progresses from step 416 to step 418, in which the integration module 114 determines whether the current gaze position is in the same vicinity as the position of step 414. Also, the module 114 keeps the cursor in this same position, as shown by step 420. Alternatively, if the cursor was hidden in step 414, then the module 114 displays the cursor in the position from which it was hidden. Following step 420, control passes to step 410 and continues with the routine 400 as discussed above.

However, if step 418 finds the user's current gaze area at the time of renewed activity differs from the cursor's resting position from step 414, then control advances to step 408, which computes a new initial display position for the cursor, and warps the cursor accordingly, as described above. Following step 408, the routine 400 continues as discussed above.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer-implemented method for eye gaze assisted cursor positioning a video screen, comprising:

operating a gaze tracking apparatus to monitor eye orientation of a computer operator as the operator views a video screen and compute a measured gaze position of the operator upon the video screen according to the monitored eye orientation, and concurrently monitoring a operator input device for mechanical activation by the operator;

according to the operator's eye orientation, determining a gaze area comprising a sub-region of the video screen including the measured gaze position; and suspending display of a cursor until detection of activation of the operator input device, and thereupon computing an initial cursor display position within the gaze area and displaying the cursor upon the video screen at the initial cursor display position, and then moving the cursor across the video screen in accordance with the activation of the operator input device irrespective of gaze.

2. The method of claim 1, the determining of the gaze area comprising:

calculating a sub-region of the video screen having a predetermined probability of including an actual gaze point of the operator.

3. The method of claim 2, the subregion having a substantially circular shape.

4. The method of claim 1, the subregion having a substantially fixed shape and size.

5. The method of claim 1, the computing of the initial display position comprising:

identifying a target in the gaze area;

determining a movement direction represented by the detected mechanical activation of the operator input device; and establishing the display position at the periphery of the gaze area at a location where continued movement of the cursor in the movement direction would intersect the identified target.

6. The method of claim 1, the computing of the initial display position comprising:
establishing the initial display position at a predetermined position on a periphery of the gaze area.

7. The method of claim 6, the predetermined position being the bottom of the gaze area, as viewed by the operator.

8. The method of claim 1, the operator input device comprising a computer mouse.

9. The method of claim 8, the mechanical activation of the operator input device comprising movement of the mouse.

10. The method of claim 1, the determining of the gaze area being performed in response to the detection of mechanical activation of the operator input device.

11. The method of claim 1, the measured gaze position being computed by a gaze tracking module, the method further comprising, after commencing the step of moving the cursor on the video screen in accordance with the activation of the operator input device, providing a calibration output, comprising:
receiving selection of a target by activation of the operator input device, the target having a target position; and
directing the measured gaze position and the target position to the gaze tracking module, and then the gaze tracking module performing recalibration responsive to the measured gaze position and target position to improve accuracy of future computations of measured gaze position.

12. The method of claim 1, the computation of the initial display position comprising:
determining how many targets reside in the gaze area; and
if a single target resides in the gaze area, establishing the initial display position within the single target.

13. The method of claim 1, the operating of the gaze tracking apparatus and determining of a current gaze position being performed substantially continuously.

14. The method of claim 1, the computation of the initial display position comprising:
recognizing a target in the gaze area predesignated as a default target; and
establishing the initial display position within the default target.

15. The method of claim 1, the computation of the initial display position comprising:
evaluating targets in the gaze area with respect to frequency of past selection; and
establishing the initial display position within a target with most frequent past selection.

16. The method of claim 1, the computation of the initial display position comprising:
determining how many targets reside in the gaze area; and
if multiple targets reside in the gaze area, establishing the initial display position between the targets.

17. A computer-implemented method for eye gaze assisted cursor positioning a video screen, comprising:
operating a gaze tracking apparatus to monitor eye orientation of a computer operator as the operator views a video screen and compute a measured gaze position of the operator upon the video screen according to the monitored eye orientation, and concurrently monitoring a operator input device for mechanical activation by the operator;
according to the operator's eye orientation, determining a gaze area comprising a sub-region of the video screen including the measured gaze position, the determining of the gaze area being performed repeatedly according to a predetermined schedule irrespective of detection of mechanical activation of the operator input device;
upon detection of activation of the operator input device, computing an initial display position within the gaze area and displaying a cursor upon the video screen at the initial display position, and then moving the cursor on the video screen in accordance with the activation of the operator input device irrespective of gaze.

18. A computer-implemented method for eye gaze assisted cursor positioning a video screen, comprising:
operating a gaze tracking apparatus to monitor eye orientation of a computer operator as the operator views a video screen and compute a measured gaze position of the operator upon the video screen according to the monitored eye orientation, and concurrently monitoring a operator input device for mechanical activation by the operator;
according to the operator's eye orientation, determining a gaze area comprising a sub-region of the video screen including the measured gaze position; and the determining of the gaze area being performed repeatedly according to a predetermined schedule irrespective of detection of mechanical activation of the operator input device;
upon detection of activation of the operator input device, computing an initial display position within the gaze area and displaying a cursor upon the video screen at the initial display position, and then moving the cursor on the video screen in accordance with the activation of the operator input device irrespective of gaze;
detecting mechanical inactivity of the operator input device for a predetermined time, the cursor having an ending position on the video screen;
in response to detecting the mechanical activity,
monitoring of the operator input device for mechanical activation by the operator;
operating the gaze tracking apparatus to monitor eye orientation of the computer operator as the operator views the video screen and compute measured gaze position of the operator upon the video screen according to the monitored eye orientation;
determining a current gaze area comprising a sub-region of the video screen including the measured gaze position;
upon detection of activation of the operator input device, determining a difference between the cursor's ending position and a most recently calculated gaze position; and
applying predetermined criteria to the difference, and
if the difference satisfies the criteria, repositioning the cursor at the ending position and then moving the cursor on the video screen in accordance with the activation of the operator input device irrespective of gaze;
if the difference fails the criteria, computing an initial display position within the gaze area and displaying the cursor upon the video screen at the initial display position, and then moving the cursor on the video screen in accordance with the activation of the operator input device irrespective of gaze.

19. The method of claim 18, following displaying of the cursor upon the video screen at the initial display position, ceasing the operation of the gaze tracking apparatus and determining of the gaze area.

20. A signal-bearing medium tangibly embodying a program of machine-readable instructions executable by a digital processing apparatus to perform a method for computer-implemented eye gaze assisted cursor positioning on a video screen, said method comprising:

operating a gaze tracking apparatus to monitor eye orientation of a computer operator as the operator views a video screen and compute a measured gaze position of the operator upon the video screen according to the monitored eye orientation, and concurrently monitoring a operator input device for mechanical activation by the operator;

according to the operator's eye orientation, determining a gaze area comprising a sub-region of the video screen including the measured gaze position; and suspending display of a cursor until detection of activation of the operator input device, and thereupon computing an initial cursor display position within the gaze area and displaying the cursor upon the video screen at the initial cursor display position, and then moving the cursor across the video screen in accordance with the activation of the operator input device irrespective of gaze.

21. The medium of claim 20, the determining of the gaze area comprising:

calculating a sub-region of the video screen having a predetermined probability of including an actual gaze point of the operator.

22. The medium of claim 21, the sub-region having a substantially circular shape.

23. The medium of claim 20, the sub-region having a substantially fixed shape and size.

24. The medium of claim 20, the computing of the initial display position comprising:

identifying a target in the gaze area;

determining a movement direction represented by the detected mechanical activation of the operator input device; and establishing the display position at the periphery of the gaze area at a location where continued movement of the cursor in the movement direction would intersect the identified target.

25. The medium of claim 20, the computing of the initial display position comprising:

establishing the initial display position at a predetermined position on a periphery of the gaze area.

26. The medium of claim 25, the predetermined position being the bottom of the gaze area, as viewed by the operator.

27. The medium of claim 20, the operator input device comprising a computer mouse.

28. The medium of claim 27, the mechanical activation of the operator input device comprising movement of the mouse.

29. The medium of claim 20, the determining of the gaze area being performed in response to the detection of mechanical activation of the operator input.

30. The medium of claim 20, the computation of the initial display position comprising:

evaluating targets in the gaze area with respect to frequency of past selection; and establishing the initial display position within a target with most frequent past selection.

31. The medium of claim 20, the computation of the initial display position comprising:

determining how many targets reside in the gaze area; and if multiple targets reside in the gaze area, establishing the initial display position between the targets.

32. The medium of claim 20, the operating of the gaze tracking apparatus and determining of a current gaze position being performed substantially continuously.

33. The medium of claim 20, the measured gaze position being computed by a gaze tracking module, the method further comprising, after commencing the step of moving the cursor on the video screen in accordance with the activation of the operator input device, providing a calibration output, comprising:

receiving selection of a target by activation of the operator input device, the target having a target position; and directing the measured gaze position and the target position to the gaze tracking module, and then the gaze tracking module performing recalibration responsive to the measured gaze position and target position to improve accuracy of future computations of measured gaze position.

34. The medium of claim 20, the computation of the initial display position comprising:

determining how many targets reside in the gaze area; and if a single target resides in the gaze area, establishing the initial display position within the single target.

35. The medium of claim 20, the computation of the initial display position comprising:

recognizing a target in the gaze area predesignated as a default target; and establishing the initial display position within the default target.

36. A signal-bearing medium tangibly embodying a program of machine-readable instructions executable by a digital processing apparatus to perform a method for computer-implemented eye gaze assisted cursor positioning on a video screen, said method comprising:

operating a gaze tracking apparatus to monitor eye orientation of a computer operator as the operator views a video screen and compute a measured gaze position of the operator upon the video screen according to the monitored eye orientation, and concurrently monitoring a operator input device for mechanical activation by the operator;

according to the operator's eye orientation, determining a gaze area comprising a sub-region of the video screen including the measured gaze position; the determining of the gaze area being performed repeatedly according to a predetermined schedule irrespective of detection of mechanical activation of the operator input device;

upon detection of activation of the operator input device, computing an initial display position within the gaze area and displaying a cursor upon the video screen at the initial display position, and then moving the cursor on the video screen in accordance with the activation of the operator input device irrespective of gaze.

37. A signal-bearing medium tangibly embodying a program of machine-readable instructions executable by a digital processing apparatus to perform a method for computer-implemented eye gaze assisted cursor positioning on a video screen, said method comprising:

operating a gaze tracking apparatus to monitor eye orientation of a computer operator as the operator views a video screen and compute a measured gaze position of the operator upon the video screen according to the monitored eye orientation, and concurrently monitoring a operator input device for mechanical activation by the operator;

according to the operator's eye orientation, determining a gaze area comprising a sub-region of the video screen including the measured gaze position;

upon detection of activation of the operator input device, computing an initial display position within the gaze area and displaying a cursor upon the video screen at the initial display position, and then moving the cursor on the video screen in accordance with the activation of the operator input device irrespective of gaze;

detecting mechanical inactivity of the operator input device for a predetermined time, the cursor having an ending position on the video screen;

in response to detecting the mechanical inactivity,
monitoring of the operator input device for mechanical activation by the operator;
operating the gaze tracking apparatus to monitor eye orientation of the computer operator as the operator views the video screen and compute measured gaze position of the operator upon the video screen according to the monitored eye orientation;
determining a current gaze area comprising a sub-region of the video screen including the measured gaze position;
upon detection of activation of the operator input device, determining a difference between the cursor's ending position and a most recently calculated gaze position; and
applying predetermined criteria to the difference, and
if the difference satisfies the criteria, repositioning the cursor at the ending position and then moving the cursor on the video screen in accordance with the activation of the operator input device irrespective of gaze;
if the difference fails the criteria, computing an initial display position within the gaze area and displaying the cursor upon the video screen at the initial display position, and then moving the cursor on the video screen in accordance with the activation of the operator input device irrespective of gaze.

38. The medium of claim 37, following displaying of the cursor upon the video screen at the initial display position, ceasing the operation of the gaze tracking apparatus and determining of the gaze area.

39. A computer-driven eye gaze assisted cursor positioning system, comprising:
a gaze tracking apparatus to monitor eye orientation of a computer operator as the operator views a video screen and compute a measured gaze position of the operator upon the video screen according to the monitored eye orientation;
a gaze tracking module to use the operators eye orientation to determine a gaze area comprising a sub-region of the video screen including the measured gaze position;
an operator input device, responsive to mechanical activation by a computer operator;
an operator input module monitoring the operator input device for mechanical activation; and
an integration module programmed to suspend display of a cursor until detection of activation of the operator input device, and thereupon to compute an initial cursor display position within the gaze area and display the cursor upon the video screen at the initial cursor display position, and then move the cursor across the video screen in accordance with the activation of the operator input device irrespective of gaze.

40. The system of claim 39, the determining of the gaze area comprising:
calculating a sub-region of the video screen that includes an actual gaze point of the operator with a predetermined probability.

41. The system of claim 40, the sub-region having a substantially circular shape.

42. The system of claim 39, the sub-region having a substantially fixed shape and size.

43. The system of claim 39, the computing of the initial display position comprising:
identifying a target in the gaze area;
determining a movement direction represented by the detected mechanical activation of the operator input device; and
establishing the display position at the periphery of the gaze area at a location where continued movement of the cursor in the movement direction would intersect the identified target.

44. The system of claim 39, the computing of the initial display position comprising:
establishing the initial display position at a predetermined position on a periphery of the gaze area.

45. The system of claim 44, the predetermined position being the bottom of the gaze area, as viewed by the operator.

46. The system of claim 39, the operator input device comprising a computer mouse.

47. The system of claim 46, the mechanical activation of the operator input device comprising movement of the mouse.

48. The system of claim 39, the determining of the gaze area being performed in response to the detection of mechanical activation of the operator input device.

49. The system of claim 39, the computation of the initial display position comprising:
recognizing a target in the gaze area predesignated as a default target; and
establishing the initial display position within the default target.

50. The system of claim 39, the computation of the initial display position comprising:
evaluating targets in the gaze area with respect to frequency of past selection; and
establishing the initial display position within a target with most frequent past selection.

51. The system of claim 39, the operating of the gaze tracking apparatus and determining of a current gaze position being performed substantially continuously.

52. The system of claim 39, the computation of the initial display position comprising:
determining how many targets reside in the gaze area; and
if multiple targets reside in the gaze area, establishing the initial display position between the targets.

53. The system of claim 39, the integration module being further programmed to provide a calibration output, the providing of the calibration output comprising:
after commencing the step of moving the cursor on the video screen in accordance with the activation of the operator input device;
receiving selection of a target by activation of the operator input device, the target having a target position; and
directing the measured gaze position and the target position to the gaze tracking module, and then the gaze tracking module performing recalibration responsive to the measured gaze position and target position to improve accuracy of future computations of measured gaze position.

54. The system of claim 39, the computation of the initial display position comprising:
   determining how many targets reside in the gaze area; and
   if a single target resides in the gaze area, establishing the initial display position within the single target.

55. A computer-driven eye gaze assisted cursor positioning system, comprising:
   a gaze tracking apparatus to monitor eye orientation of a computer operator as the operator views a video screen and compute a measured gaze position of the operator upon the video screen according to the monitored eye orientation;
   a gaze tracking module to use the operator's eye orientation to determine a gaze area comprising a sub-region of the video screen including the measured gaze position, the gaze tracking module determining the gaze area repeatedly according to a predetermined schedule irrespective of detection of mechanical activation of the operator input device;
   an operator input device, responsive to mechanical activation by a computer operator;
   an operator input module monitoring the operator input device for mechanical activation; and
   an integration module programmed to compute, upon detection of activation of the operator input device, compute an initial display position within the gaze area and display a predefined cursor upon the video screen at the initial display position, and then move the cursor on the video screen in accordance with the activation of the operator input device irrespective of gaze.

56. A computer-driven eye gaze assisted cursor positioning system, comprising:
   a gaze tracking apparatus to monitor eye orientation of a computer operator as the operator views a video screen and compute a measured gaze position of the operator upon the video screen according to the monitored eye orientation;
   a gaze tracking module to use the operator's eye orientation to determine a gaze area comprising a sub-region of the video screen including the measured gaze position;
   an operator input device, responsive to mechanical activation by a computer operator;
   an operator input module monitoring the operator input device for mechanical activation; and
   an integration module programmed to compute, upon detection of activation of the operator input device, an initial display position within the gaze area and display a predefined cursor upon the video screen at the initial display position, and then move the cursor on the video screen in accordance with the activation of the operator input device irrespective of gaze;
   the integration module additionally being programmed to perform operations comprising:
      detecting mechanical inactivity of the operator input device for a predetermined time, the cursor having an ending position on the video screen;
      upon detection of re-activation of the operator input device by the operator, determining a difference between the ending position and a current gaze position computed by the gaze tracking apparatus; and
      applying predetermined criteria to the difference, and
         if the difference satisfies the criteria, repositioning the cursor at the ending position and then moving the cursor on the video screen in accordance with the activation of the operator input device irrespective of gaze;
         if the difference fails the criteria, computing an initial display position within the gaze area and displaying the cursor upon the video screen at the initial display position, and then moving the cursor on the video screen in accordance with the activation of the operator input device irrespective of gaze.

57. The system of claim 56, following displaying of the cursor upon the video screen at the initial display position, ceasing the operation of the gaze tracking apparatus and determining of the gaze area.

58. A computer-driven eye gaze assisted cursor positioning system, comprising:
   first gaze tracking means monitoring eye orientation of a computer operator as the operator views a video screen and computing a measured gaze position of the operator upon the video screen according to the monitored eye orientation;
   second gaze tracking means for using the operator's eye orientation to determine a gaze area comprising a sub-region of the video screen including the measured gaze position;
   first operator input means for receiving mechanical activation by a computer operator;
   second operator input means for monitoring the first operator input means for mechanical activation; and
   integration means for suspending display of a cursor until detection of activation of the operator input device, and thereupon computing an initial cursor display position within the gaze area and displaying the cursor upon the video screen at the initial cursor display position, and then moving the cursor across the video screen in accordance with the activation of the operator input device irrespective of gaze.

* * * * *